Patented Apr. 8, 1924.

1,489,362

UNITED STATES PATENT OFFICE.

ARTHUR J. MOXHAM, OF GREAT NECK, NEW YORK, ASSIGNOR, BY MESNE ASSIGNMENTS, TO J. P. LAFFEY, TRUSTEE, OF WILMINGTON, DELAWARE.

PROCESS FOR TREATING ORES.

No Drawing.    Application filed July 27, 1921.  Serial No. 487,984.

*To all whom it may concern:*

Be it known that I, ARTHUR J. MOXHAM, a subject of the King of Great Britain, and a resident of Great Neck, in the county of Nassau and State of New York, have invented certain new and useful Improvements in Processes for Treating Ores, of which the following is a specification.

My invention relates to the extracting of metals from ores, especially to a process whereby I may effect a practical separation of the several metals contained in the ore on the large scale operations necessary for economical commercial production. I have found my process particularly useful when applied to the treatment of iron ores, which have always heretofore been so treated that practically all the metallic ingredients in the ore except the iron have been wasted. By my process I am able economically to separately recover in pure form such valuable materials as the aluminium, manganese, zinc, nickel and vanadium contents of the ore.

I have more particularly directed my attention to iron ores which contain oxides of iron, aluminium, zinc and manganese, and silica. In accordance with my process I produce as separate metals substantially all the iron, zinc and manganese contents of the ore, and a great part, or the whole, of the aluminium contents of the ore as pure alumina. Hereinafter I will describe my process with reference to such an iron ore, but it is to be understood that my process broadly may be applied to other ores and is not limited in its application to the recovery of only these specific metals.

In accordance with my process I first effect a separation of the silica from the metallic ingredients by dissolving the latter in a suitable acid. I then treat the dissolved salts so as to obtain a mixture of solid salts which are soluble at such different rates in a given fluid that a partial separation of the metallic ingredients can be effected by agitating the mixed salts in such fluid. The final separation is effected by a progressive heating of the salts which still remain unseparated, during which heating the more readily volatilizable salts are successively volatilized and collected. In order to carry out this process as a commercial operation it is necessary that the acid gases given off during the decomposition of the several salts should be recovered for further use and it is desirable that at all stages of the process residues should be carefully washed to prevent loss of reagents and of valuable metallic ingredients.

I will now describe my process with reference to its application to the extraction and separation of the metallic ingredients of the specific iron ore above specified, containing as the principal constituents iron oxide, alumina, zinc, oxide of manganese and silica.

I first treat the ore to remove the silica and convert the metallic ingredients of the ore into salts. To effect this, the ore, perhaps with some preliminary crushing and perhaps with some preliminary washing or drying or both, is leached with acid until the metal contents of the ore are entirely dissolved. This leaching may be effected by hydrochloric acid or by sulfuric acid, but I prefer to employ sulfuric acid and to follow the methods of leaching set forth in the pending application of Albert W. Davison, Serial No. 378,157, filed May 1, 1920. In accordance with this method the ore is subjected to successive leachings in sulfuric acid of suitable strength and at suitable temperature, and, thereafter, the residue is subjected to successive washings to insure the obtaining of substantially all the metal contents of the ore in the solution.

The next step is to render the several metal salts anhydrous. This may be effected either by passing the solution through an excess of concentrated sulfuric acid or by heating, or both combined. No sulfuric acid is consumed in this reaction. It merely absorbs the water and remains available for further use which occurs in somewhat diluted condition. The metal salts are now in a solid form and settle in the sulfuric acid, which is drawn off from it. If the leaching is accomplished by hydrochloric acid, instead of sulfuric acid, the salts are preferably converted to sulfates by the addition of sulfuric acid and made anhydrous.

I have found that anhydrous sulfate of aluminium is more slowly soluble in water than the sulfates of iron, zinc and manganese. The relatively greater solubility of the ferric sulfate is probably due to the presence of some ferrous sulfate, it being known that the presence of a small quantity of ferrous sulfate causes ferric sulfate to dissolve rapidly in water. Ferrous sulfate may be added, if desired. This differential solubility of the sulfates of iron, manganese and zinc, on the one hand, and sulfate of aluminium, on the other hand, is a principle which I apply in my process to enable me to obtain pure alumina. Heretofore alumina has not been produced commercially from ordinary iron ores, or from any ores containing substantial quantities of silica. For commercial purposes alumina must be extremely pure in order to be used in the manufacture into aluminium. I obtain a large proportion of the aluminium contents of the ore as pure alumina.

The mixture of anhydrous sulfates above described is agitated in water until substantially all of the sulfates of iron, manganese and zinc have gone into solution. At this point a part of the sulfate of aluminium has also been dissolved, but the greater part of it remains undissolved. I find that I can recover approximately 60% and more of the entire aluminium contents of the ore in this manner.

This pure undissolved sulfate of aluminium may now be removed and thoroughly washed, when it will be in the form of sulfate of aluminium. If desired, the sulfate of aluminium may be ignited in any suitable furnace to decompose it and thus obtain pure alumina. The sulfuric acid gas resulting from this decomposition is passed through a concentrated sulfuric acid spray in a spray tower, and is thus recovered for further use.

The dissolved sulfates are then heated in a suitable furnace. At a temperature of about 160° C., the manganese sulfate boils off and this distillation is cooled and pure manganese sulfate collected in solid form. When further heated to about 700° to 800° C. all of the sulfuric acid gas is driven off. This gas is passed through spray towers and recovered for further use. At this stage the sulfates have been converted to oxides and are in finely pulverulent form. By carrying the ignition further, however, say by subjecting the mixed oxides to an additional 250° to 400° C. temperature, the powder conglomerates and becomes hard and compact and suitable for use in a furnace without briquetting. If, however, it is desired to recover practically all of the alumina from the ore, the ignition just described may be arrested at the point where the oxides are in pulverulent form and the remaining alumina may be separated by the process known as the Bayer process, which consists in roasting the mixture with soda to convert the alumina to sodium aluminate, which is dissolved in water and converted to aluminium hydroxide by passing carbon dioxide gas through the solution. The alumina hydroxide which is in the solution is precipitated by the carbon dioxide and thus recovered for further use. Indeed this same process may be applied in lieu of the step of agitating in water, by heating the sulfates to decompose them after they have been dehydrated and treating the mixed oxides in accordance with the Bayer process, but this procedure is not specifically claimed herein, as it is claimed in my copending application Serial #592,433, filed Oct. 4, 1922.

The iron oxide may now be reduced to iron and melted in a furnace according to usual practices and made into steel. I prefer to employ the cupola and refining hearth set forth in my copending application Serial No. 378, 859, filed March 26, 1920, for this purpose. The zinc contents of the ore, if not previously separated by agitation of the mixed sulfates in water, will remain with the oxide of iron as zinc oxide and will become reduced to zinc while the iron oxide is being reduced. At a relatively low temperature the zinc will volatilize and, as is well known, may be collected in the first cold spot in the flue system, either as zinc or zinc oxide according to the nature of the gases in the flues.

If a highly purified steel is desired, or pure alloys, such as ferro-manganese, ferro-silicon or ferro-aluminium are desired, the electric furnace may be employed, as set forth in my said copending application. When ferro-aluminium is desired I may leave that part of the aluminium sulfate which is dissolved during the water treatment of the anhydrous salts with the iron and control the later smelting and melting operations according to well-known practice, so that the desired proportion of the aluminium is reduced with the iron. In case ferro-manganese is to be produced the desired proportion of manganese oxide is mixed with the iron oxide at any stage of the process after the iron oxide has been produced. To produce ferro-silicon a suitable quantity of the silica separated by the leaching process is added to the bath of the electric furnace and there reduced.

My process is, therefore, one which permits efficient and economical production from iron ores of a great variety of highly purified products in a single plant. The component parts of the ore are separated, completely or not quite so as desired, and the pure or relatively pure separate batches of the different ingredients are each valuable separately or may be mixed in proper proportion according to the demands of the market. Heat is conserved; the reagents are cheap because used over and over again with but insignificant loss; the quantity of fluxing materials employed is reduced to but trifling proportion to that used in the usual practices of the art. As to aluminium, my process opens up a new and limitless source of material for its economical manufacture, whereas, under prior methods, aluminium could only be commercially manufactured from a very limited number of ores.

Having thus described my invention, what I claim as new and desire to secure by Letters Patent is:

1. The process of treating ores containing a plurality of metallic ingredients and silica, which consists in separating the silica from the metalloids by leaching the ore with acid, and separating the metallic ingredients from each other by converting them to salts which are soluble in water at different rates, effecting a partial separation of the metallic ingredients by agitating the mixed salts in water, and completing the separation by a progressive heating of the dissolved salts to successively volatilize the more readily volatilizable salts and to decompose all of them.

2. The process of treating iron ores which also contain alumina and other metallic ingredients and silica, which consists in removing the silica by leaching the ore with acid, separating part or all of the alumina contents of the ore, and progressively heating the mixed salts of the other metallic ingredients, including the iron salt, to successively volatilize and decompose the metallic ingredients other than iron and to decompose the iron salt to oxide of iron.

3. The process of extracting metals from iron and aluminium bearing ores which includes dissolving the metal contents of the ore in sulfuric acid, rendering the sulfates of iron and aluminium anhydrous and partially separating the sulfates by dissolving the iron sulfate in water.

4. The processs of extracting and separating iron and aluminium from ores which includes leaching the ore with acid to separate the silica, converting the dissolved salts of iron and aluminium into solid salts which are soluble at different rates in a given fluid, then partially separating them by dissolving substantially all of one of the salts.

5. The process of extracting metals from ores containing an admixture of them which includes leaching the ore with acid, treating the salts to make them soluble at different rates in a given fluid, and then subjecting them to the action of said fluid under conditions suitable to dissolve substantially all of the more rapidly soluble of said salts.

6. The process of producing alumina from ores containing iron and aluminium which consists in converting the iron and aluminium contents of the ore into salts which are soluble at different rates in a given fluid, subjecting them to the action of such fluid under such conditions as to separate more or less the aluminium salt from the mixture, and then decomposing the aluminium salt thus produced.

7. The process of producing alumina from ores containing iron and aluminium which consists in converting the iron and aluminium contents of the ore into salts which are soluble at different rates in water, subjecting the salts to agitation in water until substantially all of the iron salt is dissolved, separating the undissolved aluminium salt, and decomposing it.

8. The process of producing alumina from ores containing iron and aluminium, which consists in treating the ore to produce sulfates of iron and aluminium, rendering said sulfates anhyrdous, subjecting them to agitation in water until the sulfate of iron is substantially all dissolved, and igniting the undissolved sulfate of aluminium.

9. The method of treating ores carrying two or more metals which consists in converting the metal contents of the ore into salts that are soluble at different rates in a given fluid, subjecting the salts to the action of such fluid, and removing the undissolved material when a given partial separation has been effected.

10. The method of treating iron ores containing iron, aluminium, manganese, zinc and silica which consists in removing the silica, converting the metal contents of the ore to salts that are soluble at different rates in water, separating a substantial part of the aluminium salt from the remaining salts by agitating the mixed salts in water until substantially all of the remaining salts are in solution, heating the aluminium salt to produce alumina, drying and heating the dissolved salts to successively volatilize the manganese salt and decompose the iron and zinc salts, and reducing the oxides of iron and zinc.

11. The method of producing pure aumina from iron ores which consists in removing the silica from the ore and converting the metallic ingredients into salts of which the aluminium salt is less rapidly soluble in water than the other salts, agitating the mixed salts in water until all of them have dissolved except a part of the aluminium salt, and then removing, washing and decomposing the undissolved portion of the aluminium salt.

In testimony whereof, I have signed my name to this specification.

ARTHUR J. MOXHAM.